United States Patent
Bains et al.

(10) Patent No.: US 10,797,893 B2
(45) Date of Patent: Oct. 6, 2020

(54) SINGLE PAIR ETHERNET MANAGEMENT INTERFACE

(71) Applicant: CISCO TECHNOLOGY, INC., San Jose, CA (US)

(72) Inventors: Amrik S. Bains, Livermore, CA (US); Kenneth Christian Naumann, Livermore, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 137 days.

(21) Appl. No.: 16/219,810

(22) Filed: Dec. 13, 2018

(65) Prior Publication Data

US 2020/0195450 A1 Jun. 18, 2020

(51) Int. Cl.
*G06F 13/42* (2006.01)
*H04L 12/10* (2006.01)
*G06F 13/16* (2006.01)
*H04L 5/14* (2006.01)

(52) U.S. Cl.
CPC .......... *H04L 12/10* (2013.01); *G06F 13/1668* (2013.01); *G06F 13/4265* (2013.01); *G06F 13/4282* (2013.01); *H04L 5/14* (2013.01); *G06F 2213/0016* (2013.01)

(58) Field of Classification Search
CPC .................. G06F 13/4265; G06F 13/4282
See application file for complete search history.

(56) References Cited

U.S. PATENT DOCUMENTS

| 7,225,282 | B1* | 5/2007 | Lyle | G06F 13/4045 |
| | | | | 710/105 |
| 7,940,787 | B2 | 5/2011 | Karam | |
| 9,189,043 | B2 | 11/2015 | Vorenkamp et al. | |
| 10,007,628 | B2 | 6/2018 | Pitigoi-Aron et al. | |
| 2014/0013017 | A1 | 1/2014 | Decesaris | |
| 2015/0067206 | A1 | 3/2015 | Luo | |
| 2018/0060269 | A1 | 3/2018 | Kessler | |
| 2018/0365188 | A1* | 12/2018 | Srivastava | G06F 13/4045 |

OTHER PUBLICATIONS www.cisco.com, Amrik Bains, Intra-Switch Management Interface Use Cases for Single Pair Ethernet, Jul. 17, 2017.
Fieldcomm Group: "Technologies and Standards for Process Automation: Advanced Physical Layer for Ethernet—Ethernet to the Field (APL)", Dec. 10, 2018.

* cited by examiner

*Primary Examiner* — Albert Wang
(74) *Attorney, Agent, or Firm* — Cindy Kaplan (57) ABSTRACT

In one embodiment, a method includes detecting a slave device at a master device, determining at the master device if the slave device is configured for I2C (Inter-Integrated Circuit) or SPE (Single Pair Ethernet) based on an output at the slave device, and selecting an I2C mode of operation at the master device if the slave device is configured for I2C, or selecting an SPE mode of operation at the master device if the slave device is configured for SPE. Data and control are selected from an I2C controller at the master device in the I2C mode of operation and selected from a physical coding sublayer at the master device in the SPE mode of operation.

20 Claims, 10 Drawing Sheets

SINGLE PAIR ETHERNET MANAGEMENT INTERFACE

TECHNICAL FIELD

The present disclosure relates generally to management control planes, and more particularly, to a Single Pair Ethernet (SPE) management interface.

BACKGROUND

Switches and routers contain many devices, some of which may not support common management controller interfaces. Problems often arise with supporting different interfaces. For example, each interface may need a different software driver and maintenance. Also, the interfaces may be very difficult to debug due to lack of support for protocol error detection and recovery, especially with half-duplex operation. Another drawback is limited bandwidth with conventional two-wire interfaces.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises detecting a slave device at a master device, determining at the master device if the slave device is configured for I2C (Inter-Integrated Circuit) or SPE (Single Pair Ethernet) based on an output at the slave device, and selecting an I2C mode of operation at the master device if the slave device is configured for I2C, or selecting an SPE mode of operation at the master device if the slave device is configured for SPE. Data and control are selected from an I2C controller at the master device in the I2C mode of operation and selected from a physical coding sublayer at the master device in the SPE mode of operation.

In one or more embodiments, determining at the master device the slave device is configured for I2C comprises detecting a high value based on a pull-up resistor or detecting a voltage greater than two volts at the output of receivers. Determining at the master device the slave device is configured for SPE may comprise detecting an output voltage of zero based on a pull-down resistor.

In one or more embodiments, selecting the data and control from the physical coding sublayer comprises utilizing a logical link control block to interface with higher level management and memory.

A supply voltage at a physical medium attachment block may be selected based on I2C mode of operation or SPE mode of operation using arbitration control logic at the master device.

In one or more embodiments, the master device and the slave device communicate over a point-to-point link. The master device may also be in communication with a plurality of slave devices over a point-to-multipoint link segment. The master device may be configured for full-duplex operation or half-duplex operation.

In another embodiment, an apparatus generally comprises an arbitrator for detecting a slave device at a master device and determining if the slave device is configured for I2C (Inter-Integrated Circuit) or SPE (Single Pair Ethernet) based on an output at the slave device. The apparatus further comprises an I2C controller and a logical link control block. Data and control are selected from the I2C controller at the master device in the I2C mode of operation and selected from a path comprising the logical link control block at the master device in the SPE mode of operation.

In yet another embodiment, an SPE (Single Pair Ethernet) management interface comprises a transmitter and receiver for transmitting and receiving data to and from an end point device, an arbitrator for selecting a mode of operation based on detection of a protocol capability at the end point device, a logical link controller for use in an SPE mode of operation upon detection of an SPE end point device, and a controller for use with another mode of operation, wherein data and control signals bypass the logical link controller in the other mode of operation.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Network devices such as switches and routers often include devices that may not support common management controller interfaces. Examples include I2C (Inter-Integrated Circuit) (also referred to as I²C), typically used on optical modules, AC/DC power supplies, fan control, DC-DC converters, temperature monitors, EPROM (erasable programmable read-only memory), and the like, which use two-wires for clock and shared data (Tx/Rx) and are bandwidth limited due to half-duplex and protocol. Other examples include: UART (Universal Asynchronous Rx/Tx), typically used on microcontrollers as a console port with two wires and data rate limited to about 9.6 Kb/s; MDIO (Management Data Input/Output) (IEEE 802.3 Clause 22/45), typically used on copper PHYs and fiber PHYs with two-wire interface and shared Tx/Rx (half-duplex), maximum specified management data clock of about 2.5 MHz, and average bandwidth of about 1 Mb/s; and SPI (Serial Peripheral Interface) typically used on SD (Secure Digital) cards, sensors, and eMMC (embedded Multi-Media Controller) memories and requires a minimum of four wires (clock, Rx, Tx, and select (when multiple devices are connected to same data pins)).

Difficulty in supporting different interfaces arises because each of the interfaces requires a different software driver and maintenance in conventional systems. The interfaces may also be difficult to debug if protocol error detection and recovery are not supported, especially in the case of half-duplex operation. Another drawback is that the interfaces may have limited bandwidth, which makes them unable to meet higher bandwidth using two-wire interfaces. As complexity increases, management interfaces need to provide reliable and faster access.

The embodiments described herein use an SPE (Single Pair Ethernet) management interface to replace multiple management controller interfaces to provide a common software driver and support of higher bandwidth using two-wire (single pair) on a backplane, PCB (printed circuit board), or copper cables. The management control plane and interfaces described herein allow SPE to coexist with I2C (or other protocols) in the same system and provide the ability to support link segment compatibility with I2C. In one or more embodiments, backward compatibility with I2C is provided so that SPE (e.g., 10M SPE (10 SPE)) and I2C can coexist in a system to support legacy devices (e.g., optical modules and other devices that are outdated, obsolete, no longer in production, or no longer commonly used). In one or more embodiments, the system allows for full-duplex I2C and SPE coexistence. An electrical link segment may modify an SPE transceiver to operate over existing backplane channels designed for I2C signals and voltages, for example. The system may use single-end I2C operation as well as balanced single-pair operations. As described in detail below, auto-detection may be used to dynamically detect a type of interface supported by an end device and select SPE or I2C operation (or operation in accordance with another protocol). In one or more embodiments, a new SPE control packet format may be used to access read/write I2C and MDIO registers/memory and I2C/MIDIO type messages may be mapped to Ethernet packets.

Figure 1:
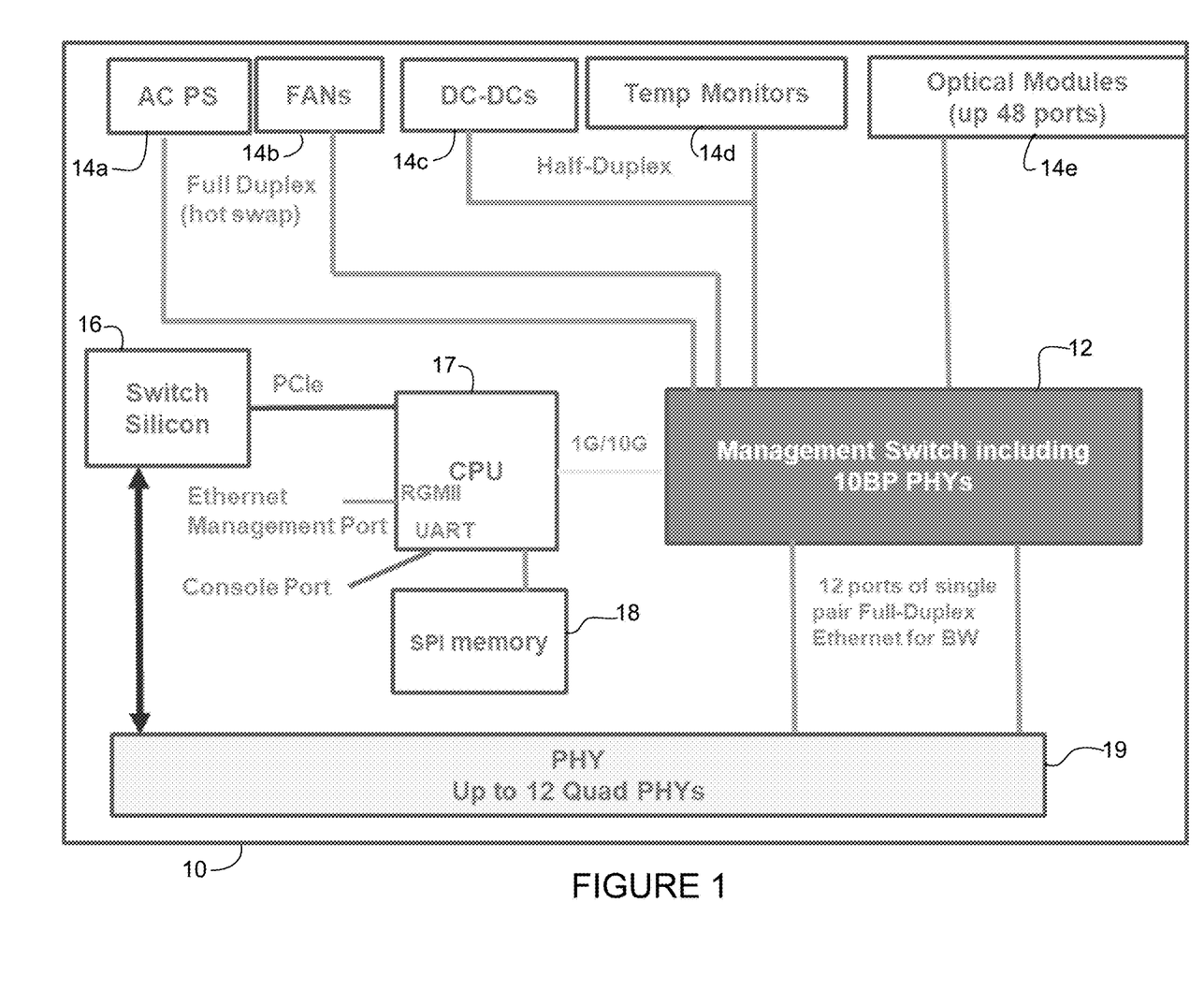
FIG. 1 is a block diagram illustrating an SPE management interface, in accordance with one embodiment.

Referring now to the drawings and first to FIG. 1, an SPE management interface system 10 is shown, in accordance with one embodiment. The SPE management interface system 10 may be used to replace conventional management control planes, which utilize various components and management interfaces requiring different software drivers and resulting in reduced bandwidth performance. The SPE management interface system 10 described herein uses two pins that only need a single software driver and one debug tool, and provides higher access bandwidth, which is needed, for example, by new copper PHYs and optical modules (e.g., 100G/200G/400G, etc.) that have firmware download and MIB (Management Information Base) (counters/status) monitoring features. A single port SPE management interface macro may be used to build a multi-port PHY (e.g., up to 12 quad PHYs) and integrate in an ASIC (Application-Specific Integrated Circuit), FPGA (Field Programmable Gate Array), CPU (Central Processing Unit), MCU (Microcontroller Unit), and the like.

The SPE management interface system 10 shown in FIG. 1 includes a management switch 12 in communication with a plurality of devices, including AC PS (alternating current power supply) 14a, fans 14b, DC-DC converters 14c, temperature monitors 14d, and optical modules 14e. In one example the AC PS 14a and fans 14b may include full duplex interfaces and the DC-DC converter 14c and temperature monitor 14d interfaces may be half-duplex. Switched point-to-point full duplex may be used for bandwidth or hot-swappable devices. The optical modules 14e may comprise, for example, up to 48 ports. It is to be understood that these are only examples, and the management switch (interface) 12 may be in communication with any number or type of components. For example, the management switch 12 may be scaled for a suitable number of slave devices, as described below.

The management interface system 10 further includes a switch 16 and CPU 17 in communication over a PCIe (Peripheral Component Interconnect express) link. The CPU may include an RGMII (Reduced Gigabit Media-Independent Interface) for use as an Ethernet management port and a UART (Universal Asynchronous Receiver-Transmitter) for use as a console port. The CPU 17 may also be in communication with SPI (Serial Peripheral Interface) memory 18, or any other suitable memory. In the example shown in FIG. 1, the management switch 12 includes twelve ports of single pair full-duplex Ethernet interfaces in communication with up to twelve quad PHYs 19. The interface may be on the same physical board or across a backplane or twin axial cable with at least two connectors, for example. As described in detail below, in one embodiment the SPE management interface includes one or more master devices (e.g., at management switch 12) in communication with one or more slave devices (e.g., 14a, 14b, 14c, 14d, 14e, or other devices) configured for I2C or SPE operation.

It is to be understood that the components, arrangement, and number of ports and interfaces shown in FIG. 1 is only an example and other components or configurations may be used, without departing from the scope of the embodiments.

In one or more embodiments, a single port SPE management interface macro (IP block) is configured to operate in accordance with IEEE 802.3cg (10BASE-TS1) over, for example, 60" of FR4 and four SPE connectors, as described below with respect to FIG. 6B. The SPE management interface is preferably configured to provide auto-negotiation to select 10MB/s, full-duplex or half-duplex. The SPE management interface may also be configured to operate in point-to-point full duplex, point-to-multipoint half-duplex (with no PLCA (PHY-Level Collision Avoidance) and half-duplex (10/100BASE-T). The management interface may operate, for example, in accordance with IEEE 802.3cg clause 3 and 4 for MAC (Media Access Control) and clause 147.3 for PCS (Physical Coding Sublayer). It is to be understood that the SPE management interface described herein may also be configured to operate in accordance with other standards or future standards, without departing from the scope of the embodiments.

Figure 2:
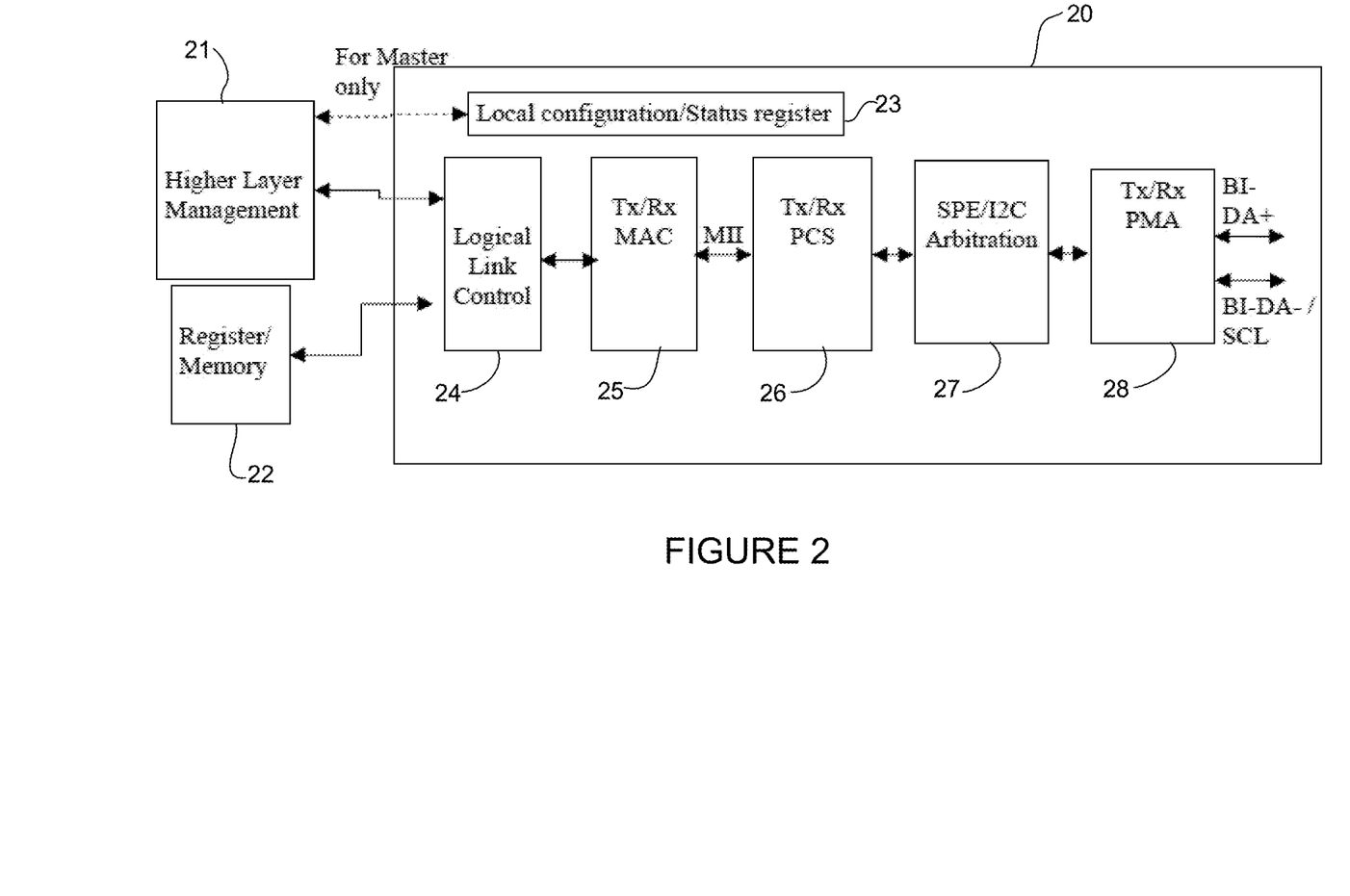
FIG. 2 illustrates function blocks for an SPE management interface for use with an SPE device, in accordance with one embodiment.
Figure 3:
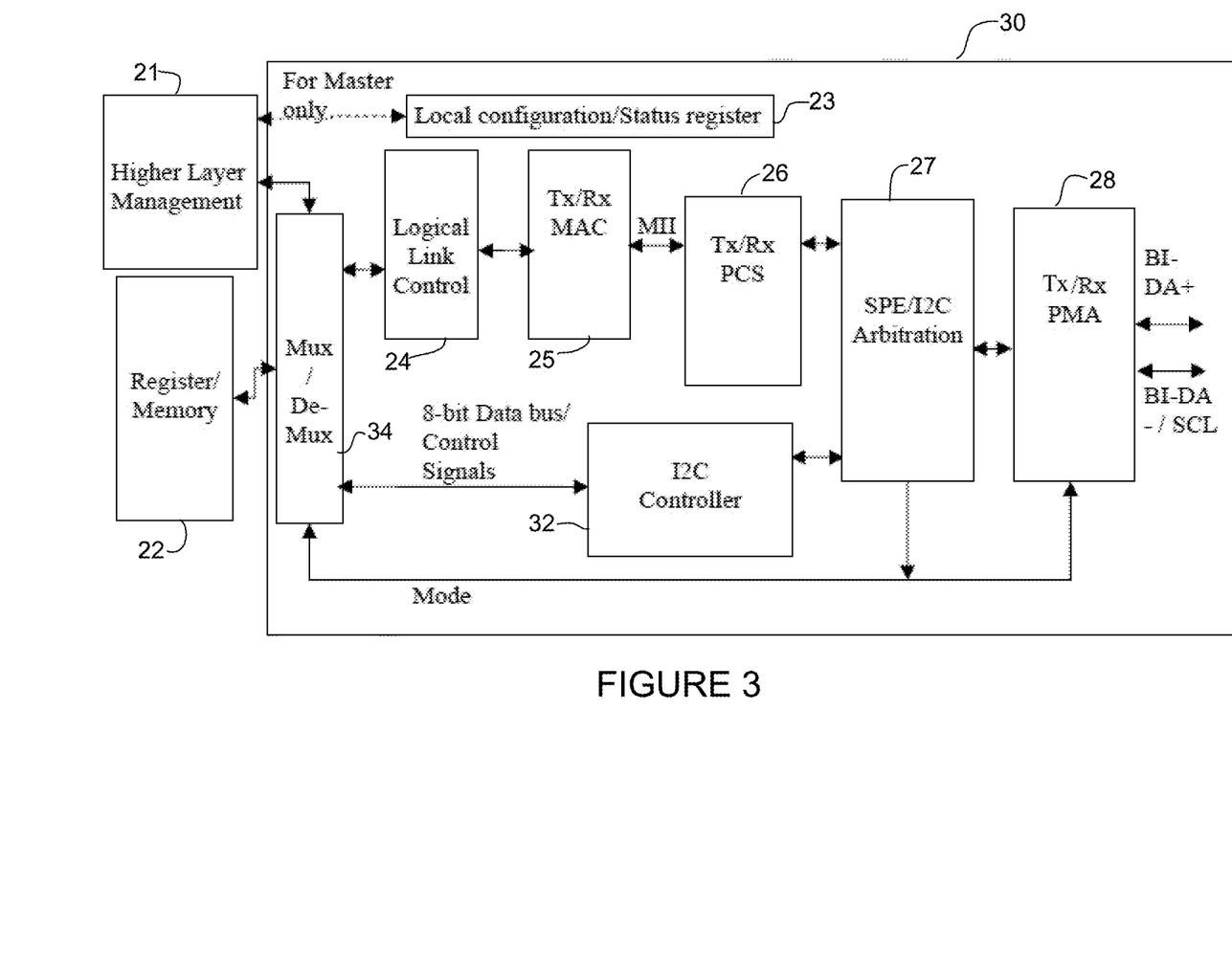
FIG. 3 illustrates function blocks for an SPE management interface for use with an SPE or I2C device, in accordance with one embodiment.

FIGS. 2 and 3 illustrate example architectures for single port SPE management for SPE and SPE/I2C, respectively. FIG. 2 illustrates functions at a node 20 (SPE master) for single port SPE management for SPE and FIG. 3 illustrates functions at a node 30 (SPE/I2C master) for single port SPE management for SPE and I2C. Each node 20, 30 is in communication with higher layer management 21 and register/memory 22. The higher layer management 21 generates requests for read/write, address, and data to/from the register. The register/memory 22 may be provided per application requirement. The master (host) includes a local configuration/status register 23.

Each node 20, 30 includes a logical link controller (logical link control block, logical link control layer, LLC) 24 for mapping between register/memory 22 to or from Ethernet frame data. The logical link control block 24 provides data or receives data from a transmission/receive (Tx/Rx) MAC block 25, which is in communication with PCS (physical coding sublayer) 26 via a media independent interface for SPE mode of operation. The LLC 24 interfaces with the higher level management entity 21, register/memory 22, and the Tx/Rx MAC 25 in SPE mode of operation. The LLC 24 provides MAC DA (destination address), SA (source address), Type, and MAC client data derived from/to register/memory block 22. The MAC function block 25 creates MAC packets and may support, for example, full-duplex and half-duplex modes and retransmission of packets in case of collision in half-duplex mode. In most applications, the master initiates access requests and not the slave device, so there is no collision. In one or more embodiments, the LLC 24 may use a link layer data discovery protocol (LLDP) as defined in IEEE 802.3 clause 79, for example. Since frames are created and terminated within the master/slave devices there should not be overlap with other use cases for an LLDPDU (LLDP Data Unit). The LLDPDU field may include a TLV field comprising SPE information. In one example, the SPE information comprises control, address, and data requested by the higher layer management control system 21.

Tx/Rx PMA (Physical Medium Attachment) block 28 may operate in accordance with IEEE 802.3cg clause 147.5 modified PMA (e.g., I2C driver/physical mode or 10BASE-TS1 to meet FR4 PCB channel with one to three connectors). The Tx/Rx PMA 28 includes two bidirectional ports for data (SDA (Serial Data Line) and SCL (Serial Clock Line)). In one or more embodiments, PMA supports IEEE 802.3cg clause 147 and I2C signaling on the physical dependent interface (e.g., MDI (Medium Dependent Interface)). Changes may be made to termination topology (e.g., link segment) defined in clause 147 to support backward I2C compatibility, as described further below. The PMA block 28 receives data from an SPE/I2C arbitration block (arbitrator) 27 as 4B/5B symbols from/to PCS block 26 in SPE mode or as serial data/serial clock from I2C controller 32 in I2C mode (FIG. 3).

SPE/I2C arbitration provides control to select the data and MDI to be used by the PMA block 28. In one example, if SPE mode is selected, the PMA 28 uses 1V supply voltage (FIGS. 3 and 4), transmits/receives 5-bit code words and sends/receives DME based signaling. If I2C mode is selected, the PMA 28 uses 3.3V supply voltage and sends/receives I2C data and clock signals (FIGS. 3 and 5). SPE/I2C arbitration block 27 selects a mode of operation for the master 30 with SPE/I2C support as described in detail below with respect to FIGS. 4 and 5.

As shown in FIG. 3, the SPE/I2C master device 30 includes the I2C controller 32 in communication with the SPE/I2C arbitration block 27 and mux/demux (multiplexer/demultiplexer) 34. The mux/demux 34 receives from or forwards to the LLC 24 for SPE mode of operation with an SPE end point or I2C controller 32 for I2C mode of operation with an I2C endpoint.

The master 30 may, for example, default to I2C mode on power up, reset, or detection of slave end device. When the master node 30 detects the slave device, it performs a detection process to determine if the device is configured for I2C or SPE, as described below with respect to FIGS. 4, 5, and 10. If the slave device is configured for I2C, the I2C operation mode is selected and the management entity starts I2C operation. If the slave is not configured for I2C, the SPE operation mode is selected and the management entity starts SPE operation functions as previously described with respect to SPE logical link control.

Figure 4:
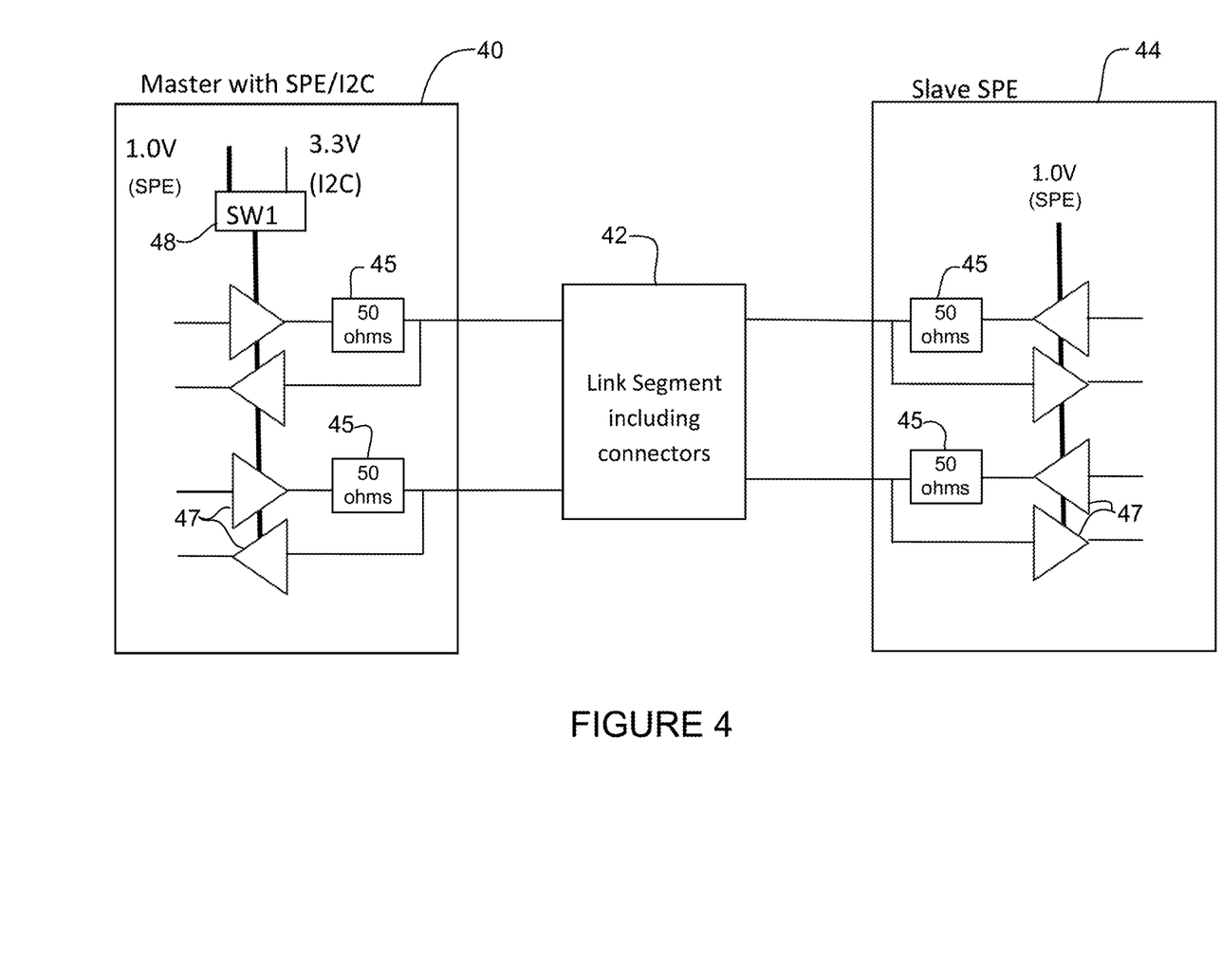
FIG. 4 illustrates an SPE/I2C master device in communication with an SPE slave device, in accordance with one embodiment.
Figure 5:
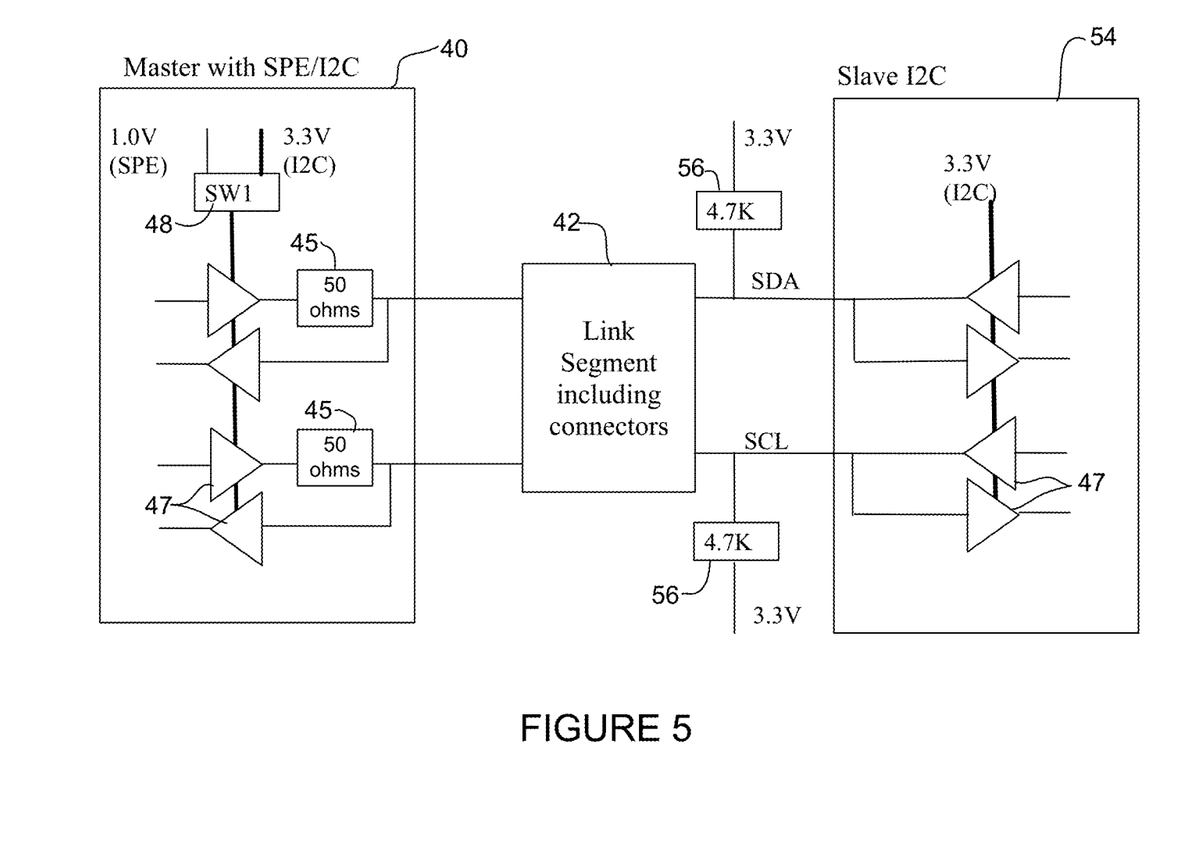
FIG. 5 illustrates the SPE/I2C master device in communication with an I2C slave device.

It is to be understood that the function blocks and arrangements shown in FIGS. 3 and 4 are only examples and function blocks may be added or modified without departing from the scope of the embodiments. Also, I2C protocol is provided as an example and the SPE management interface may be configured for management control plane operation with SPE and another protocol that is typically supported by a different management controller interface in conventional systems. For example, the I2C controller may be replaced with another controller configured for management control of an end device operating with a protocol other than I2C to provide a common management interface and allow SPE to coexist with other protocols and support various legacy devices.

FIGS. 4 and 5 illustrate examples of master/slave operation with arbitration, in accordance with one embodiment. SPE/I2C arbitration on a master node 40 determines the mode of operation; SPE (FIG. 4) or I2C (FIG. 5). Operation with an SPE slave end point device 44 is shown in FIG. 4 and with an I2C slave end point device 54 is shown in FIG. 5 for point-to-point MDI modes. Point-to-point supports full and half-duplex modes of operation. In one embodiment, half-duplex is set by default, while full-duplex follows forced mode or auto-negotiation. In one or more embodiments, the master device 40 determines if the slave end device is configured for SPE (node 44 in FIG. 4) or I2C (node 54 in FIG. 5) based on an output at the slave device (e.g., output voltage at receiver, high/low value). As described below, the operating mode may be selected at the master device 40 based on an output resulting from pull-up or pull-down resistors, which change impedance on the line.

FIG. 4 shows an SPE management interface with the master SPE/I2C 40 and the slave SPE 44 interconnected through a link segment 42. In this configuration, the master 40 and slave 44 may use 1.0V VDD supply and DME signaling with 1V peak-to-peak voltage levels in SPE mode. In the case of an SPE slave end point device as shown in FIG. 4, outputs are floating, but since there is pull-down on the receiver, the output of the detector will be zero. In this case SPE is selected and supply voltages on the PMA 28 are set to 1V and data and control are selected from/to the SPE PCS block 26 on the path through the LLC 24 (FIGS. 3 and 4).

FIG. 5 illustrates an example of the master SPE/I2C 40 and the I2C slave 54. In this case, link segment 52 has additional termination with 4.7 kohms (4.7K) pull-up to 3.3V (e.g., on PCB). If the master 40 detects the presence of the pull-up resistor 56, it switches to I2C mode. With the 4.7K pull-up, the master 40 switches to single-end voltage mode to drive SDA and SCL on each output. Since the I2C has pull-up output at the two receivers, voltage will be higher (e.g., >2V). If both receiver outputs are high, I2C mode is selected and data control is selected from I2C controller block 32 (FIGS. 3 and 5). It is to be understood that other pull-up or pull-down resistor values or voltage levels may be used without departing from the scope of the embodiments.

The master and slave nodes 40, 44, 54 may contain any number of resistors (e.g., 50 ohms as shown in FIGS. 4 and 5), drivers (transmitters)/receivers 47, or other circuit components. A switch (SW1) 48 at the master 40 switches between 1.0V for the SPE slave 44 (FIGS. 4) and 3.3V for the I2C slave 54 (FIG. 5). In the examples shown in FIGS. 4 and 5, the default supply voltage is 3.3V on PMA and driver output is tri-stated. When the presence of a slave endpoint is detected, arbitration logic selects the control and data path. In one embodiment, the arbitration logic 27 includes a receiver with about 1M ohms pulldown to ground. It may also be possible to use output from Rx PMA 28 directly (FIG. 3).

In I2C mode, module select signal and 7-bit or 10-bit addresses may be used to access a slave end device (FIG. 5). In SPE mode (FIG. 4), there are two methods to address the slave devices. In a first method, module select signal is active and address is mapped to lower bits of the MAC DA (destination address). A second method uses DA and LLC (Logical Link Control) addresses without using the module select signal. MAC DA may be used as device select, while LLC address may be used for register/memory access. In this case, on reset or module insertion, address assignment is done by the master on the slave end devices. This mode of addressing scales to support switch features when multiple SPE management interfaces are used with a switch.

The master (host) and slave may be located on the same board (e.g., FR4 type) chip-to-chip with the interface configuration predetermined and selected on reset. The master and slave may also communicate from board-to-board over a backplane (chip-to-chip). In another example, the master and slave may be chip-to-module/plug (e.g., fiber/copper) and the modules may be dynamically changed during system operation. The master and slave may also communicate over a cable (e.g., host to fan tray, host to power supply) with the interface configuration predetermined on reset or hot swappable and the interface type dynamically identified.

It is to be understood that the master/slave configurations shown in FIGS. 4 and 5 and arbitration process described above is only an example and changes may be made without departing from the scope of the embodiments. For example, the resistance values, voltage levels, or arrangement of electrical components may be different than shown in FIGS. 4 and 5.

Figure 6A:
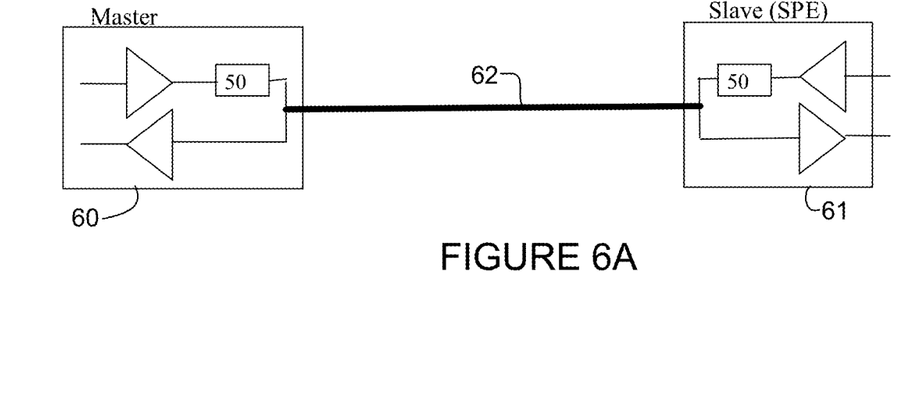
FIG. 6A illustrates an example of a point-to-point link segment for the SPE/I2C master and SPE slave device shown in FIG. 4.
Figure 6B:
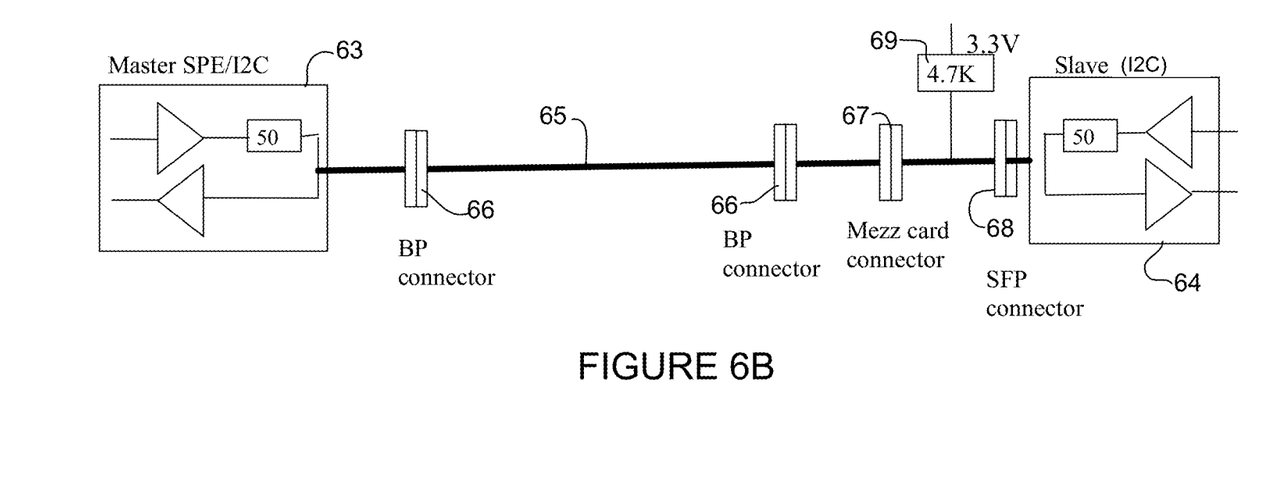
FIG. 6B illustrates an example of a point-to-point link segment for the SPE/I2C master and I2C slave device shown in FIG. 5.

FIGS. 6A and 6B illustrate details for an end-to-end link segment, in accordance with one embodiment. In one example, a master node 60 is in communication with an SPE slave node 61 using a differential pair on a short (e.g., four inches) FR4 stripline/micro-strip PCB trace 62 with no connectors. FIG. 6B illustrates an example of master SPE/I2C node 63 in communication with SPE/I2C slave node 64 over point-to-point link segment 65 with connectors 66, 67, 68. In the example shown in FIG. 6B, the link segment 65 comprises a longer (e.g., 60 inches) FR4 stripline/micro-strip PCB trace, a 4.7K pull-up 69 and four connectors (two backplane connectors 66, one mezzanine card connector 67, and one SFP connector 68) supporting SPE and I2C termination. The backplane and mezzanine connectors 66, 67 may support 10 MHz speed, for example.

Figure 7:
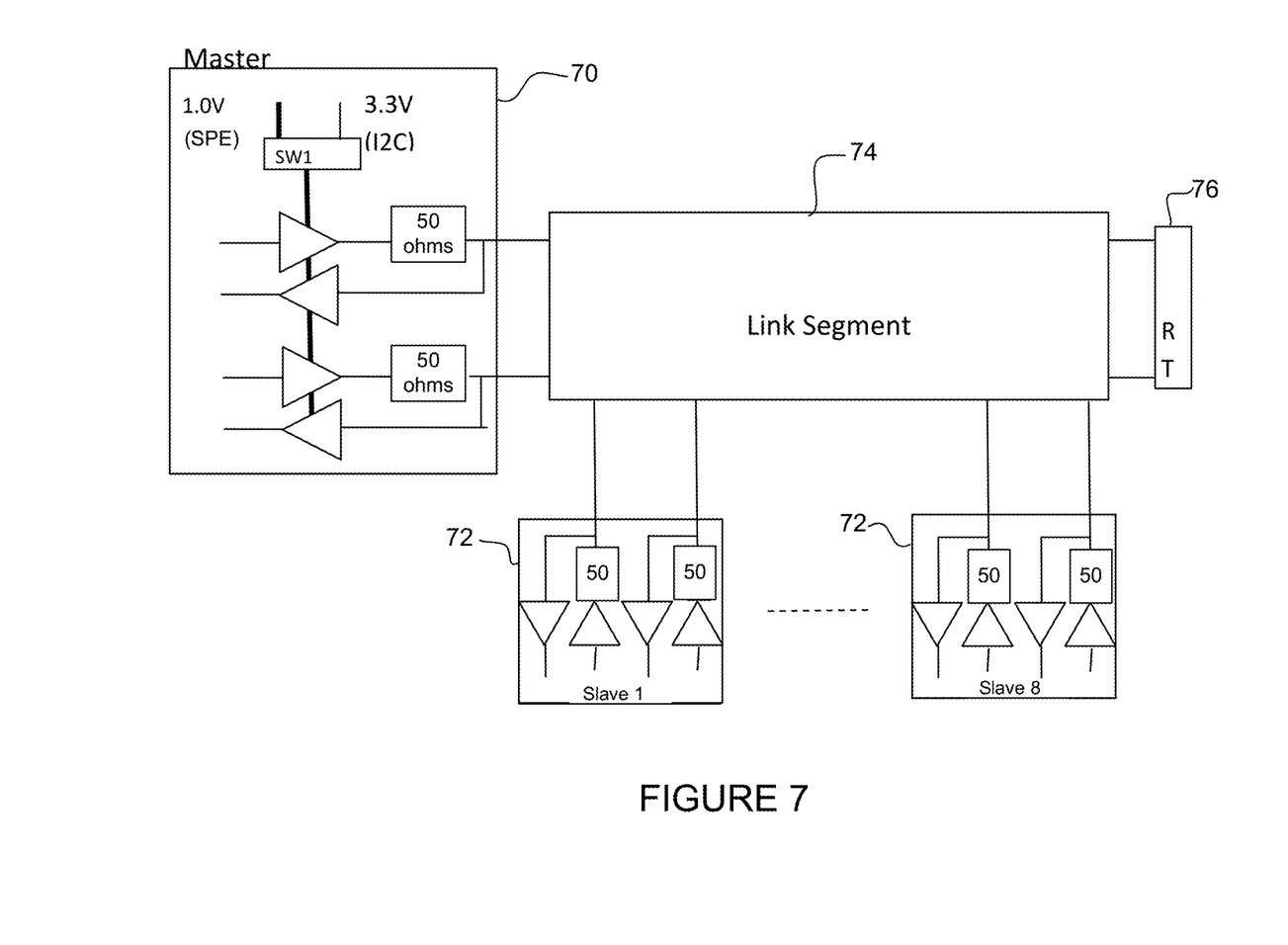
FIG. 7 illustrates a point-to-multipoint connection between the master device and a plurality of slave devices, in accordance with one embodiment.
Figure 8:
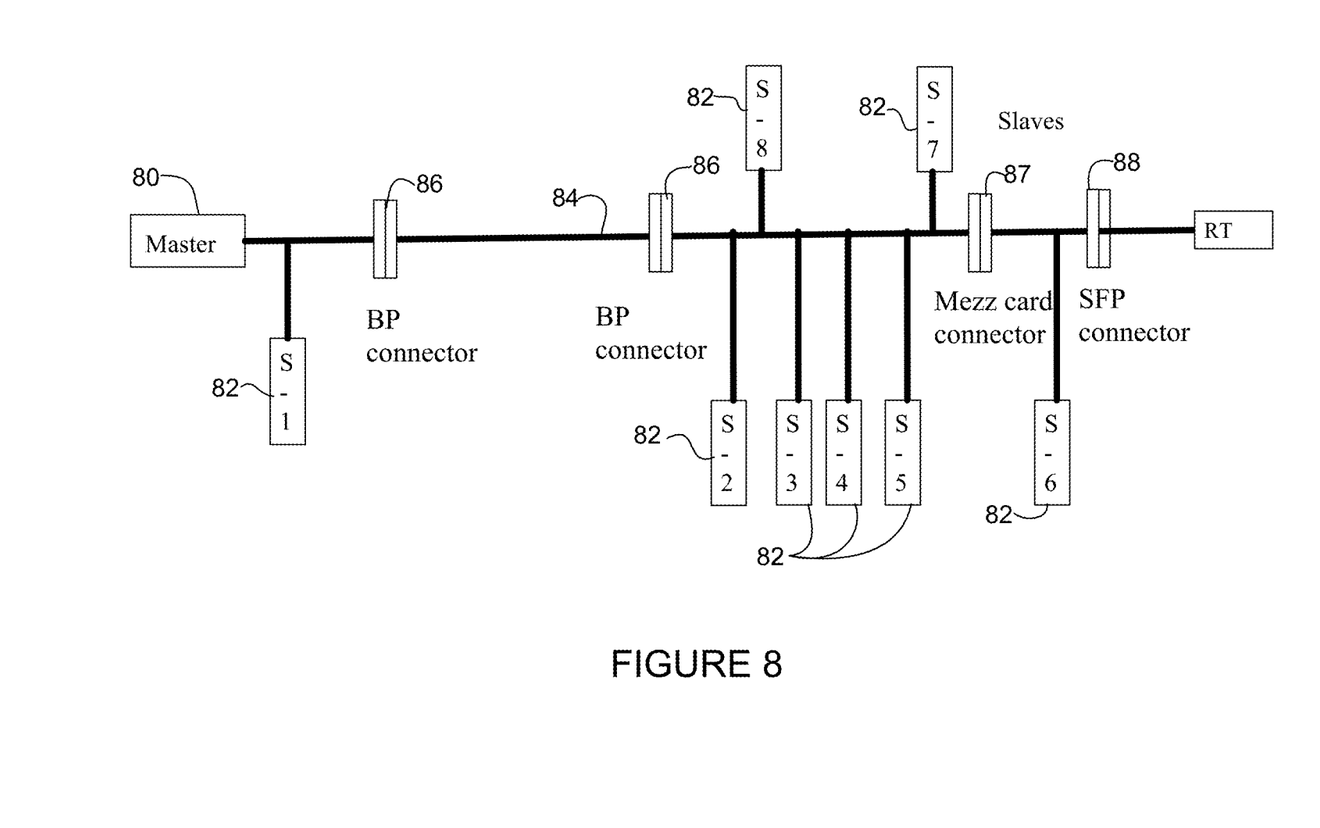
FIG. 8 illustrates an example of a point-to-multipoint link segment between the master device and slave devices of FIG. 7.

FIGS. 7 and 8 illustrate an SPE management interface configured for point-to-multipoint, in accordance with one embodiment. A master node 70 is in communication with a plurality of slave nodes 72 (e.g., up to eight slave devices for a 20 inch FR4 trace) on a link segment 74 comprising, for example, three connectors on a 60 inch FR4 trace (FIG. 7). In one embodiment the system is preconfigured in I2C or SPE on power up and there are no auto-negotiation or mode changes after power up. In this example, the master and slave nodes are of the same type (e.g., I2C/I2C or SPE/SPE). The master node 70 and slave devices 72 may be in tri-state mode (half-duplex) until they are ready to send. In case of collision, resolution may be handled in accordance with IEEE 802.3cg, clause 22. RT (termination resistor) 76 is preferably selected to match the characteristic impedance of a single pair.

FIG. 8 illustrates a point-to-multipoint link segment configuration, in accordance with one embodiment. The system includes a master node 80 in communication with eight slave devices 82 over main trace 84. The example shown in FIG. 8 is for a worst case trace length (e.g., 60 inches FR4 stripline/micro-strip PCB trace main trace 84, 20 inch trace from main trace to slave devices 82). The main trace 84 includes two backplane connectors 86, one mezzanine card connector 87 and one SFP connector 88.

The link segment (channel) is preferably configured for low insertion and loss and better return loss. The system may be configured to include, for example, bidirectional drivers based on digital CMOS (Complementary Metal-Oxide Semiconductor) I/O (Input/Output) technology, clock recovery with simple edge detection, Rx using non-linear slicer, no echo-canceller for full-duplex, point-to-multi-point echo canceller using sampling, digital delay lines and XOR summer, or any combination of these attributes.

It is to be understood that the point-to-point and point-to-multipoint link segment configurations shown in FIGS. 6A-8 and described above are only examples and changes may be made (e.g., different length traces, number of connectors, number of slave devices, arrangement of components within link) without departing from the scope of the embodiments.

Figure 9A:
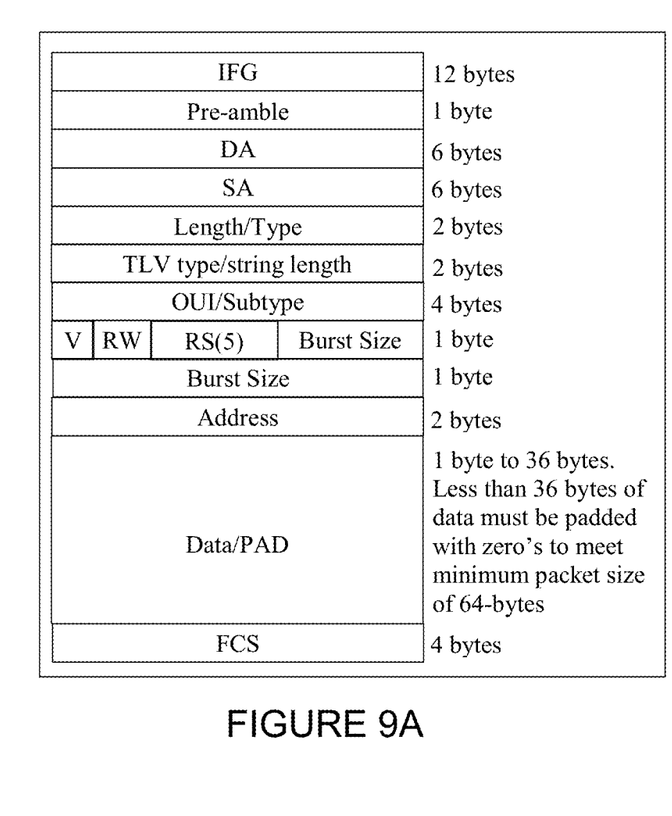
FIG. 9A illustrates a standard packet format and fields for use with the SPE management interface, in accordance with one embodiment.
Figure 9B:
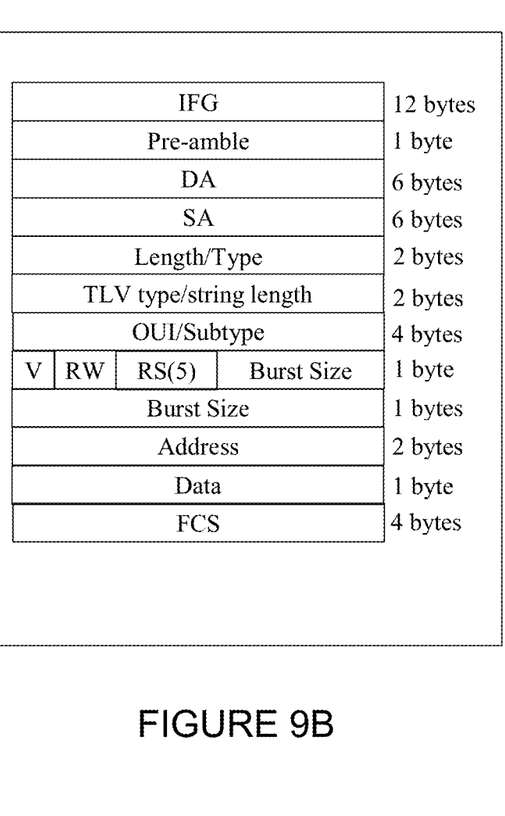
FIG. 9B illustrates a non-standard packet format and fields, for use with the SPE management interface, in accordance with one embodiment.

In one or more embodiments, basic read/write/burst access may be mapped to a standard or nonstandard packet format as shown in FIGS. 9A and 9B, respectively, for SPE packet based messages. The maximum packet size is determined from the burst size configuration. For example, with 9-bit burst size the maximum packet size is 512 bytes (492 bytes of data+LLC headers). Packet size (data) may be dynamically selected per access request. Device level address is in the MAC DA field and LLC address for register/memory is in the LLC part of the packet. Standard 64 byte Ethernet packets and non-standard packets for bandwidth efficiency are shown in FIGS. 9A and 9B, respectively. FIG. 9A shows a standard minimum 64 byte packet. FIG. 9B shows a nonstandard minimum 29 byte packet.

A single 8-bit read using Ethernet packet (64 byte)+IPG (interpacket gap) (12)+preamble (8 bytes) and FCS (frame check sequence) (4 bytes) at 10 Mbps provides bandwidth throughput of 14.8 kbps. Another option with non-standard Ethernet packet (FIG. 9B) provides 30 kbps. Further bandwidth improvements may be achieved using higher 16/32 bit data bus and burst mode.

Figure 10:
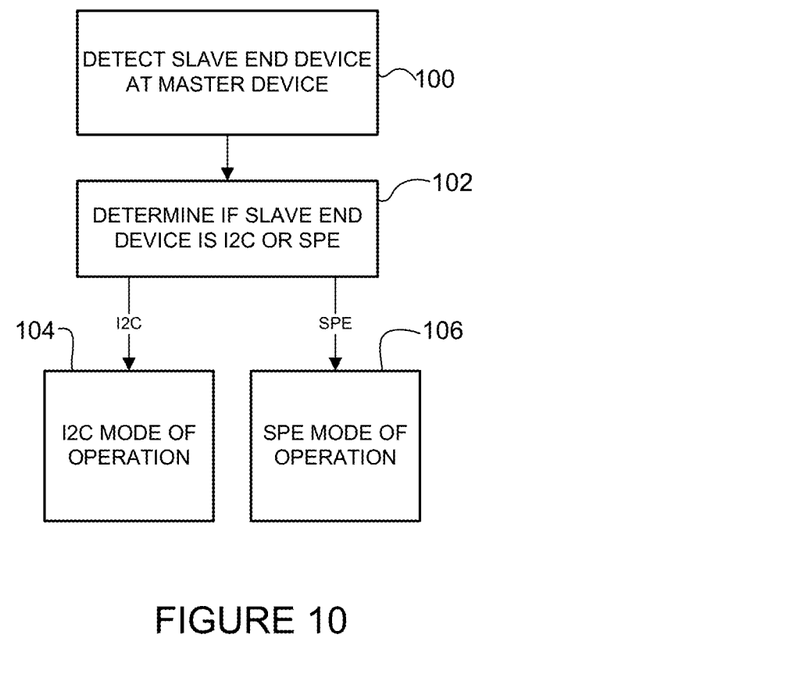
FIG. 10 is a flowchart illustrating an overview of a process for auto-detection of the slave device at the master device for operation in I2C mode or SPE mode, in accordance with one embodiment.

FIG. 10 is a flowchart illustrating an overview of a process for auto-detection at a master device of a slave end device, in accordance with one embodiment. At step 100, the master device detects a slave end device. The master device determines if the slave end device is configured for I2C or SPE based on an output at the slave end device (step 102). As previously described, the master device may, for example, detect an output at a receiver (e.g., voltage output, impedance on line) based on the presence of pull-up or pull-down resistors to determine if the slave end point device is an I2C or SPE device. The master device selects an I2C mode of operation if the slave end device is configured for I2C (step 104) and selects an SPE mode of operation if the slave end device is configured for SPE (step 106). The process may automatically repeat at power up or detection of a new slave end device. Data and control are selected from an I2C controller at the master device in I2C mode of operation and selected from a logical link controller (from an SPE physical coding sublayer) at the master device in SPE mode of operation.

It is to be understood that the process shown in FIG. 10 and described above is only an example and steps may be added or modified, without departing from the scope of the embodiments.

The embodiments described herein may operate in the context of a data communications network including multiple network devices. The network may include any number of network devices in communication via any number of nodes (e.g., routers, switches, gateways, controllers, edge devices, access devices, aggregation devices, core nodes, intermediate nodes, or other network devices), which facilitate passage of data within the network. The network devices may communicate over one or more networks (e.g., local area network (LAN), metropolitan area network (MAN), wide area network (WAN), virtual private network (VPN) (e.g., Ethernet virtual private network (EVPN), layer 2 virtual private network (L2VPN)), virtual local area network (VLAN), wireless network, enterprise network, corporate network, data center, Internet, intranet, Internet of Things (IoT) network, radio access network, public switched network, or any other network). The network device may include any combination of memory, processors, and network interfaces. Signals may be exchanged among communications equipment or devices and power transmitted from power sourcing equipment to powered devices.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A method comprising:
    detecting a slave device at a master device;
    determining at the master device if the slave device is configured for I2C (Inter-Integrated Circuit) or SPE (Single Pair Ethernet) based on an output at the slave device; and
    selecting an I2C mode of operation at the master device if the slave device is configured for I2C; or
    selecting an SPE mode of operation at the master device if the slave device is configured for SPE;
    wherein data and control are selected from an I2C controller at the master device in said I2C mode of operation, and said data and control are selected from a physical coding sublayer at the master device in said SPE mode of operation.

2. The method of claim 1 wherein determining at the master device the slave device is configured for I2C comprises detecting a high value based on a pull-up resistor.

3. The method of claim 1 wherein determining at the master device the slave device is configured for I2C comprises detecting a voltage greater than two volts at the output of receivers.

4. The method of claim 1 wherein determining at the master device the slave device is configured for SPE comprises detecting an output voltage of zero based on a pull-down resistor.

5. The method of claim 1 wherein selecting said data and control from the physical coding sublayer comprises utilizing a logical link control block to interface with higher level management and memory.

6. The method of claim 1 further comprising selecting a supply voltage at a physical medium attachment block based on said I2C mode of operation or said SPE mode of operation using arbitration control logic at the master device.

7. The method of claim 1 wherein the master device and the slave device communicate over a point-to-point link.

8. The method of claim 1 wherein the master device is configured for full-duplex operation and half-duplex operation.

9. The method of claim 1 wherein the master device is in communication with a plurality of slave devices over a point-to-multipoint link segment.

10. The method of claim 1 wherein the slave device is a legacy optical module.

11. An apparatus comprising:
    an arbitrator for detecting a slave device at a master device and determining if the slave device is configured for I2C (Inter-Integrated Circuit) or SPE (Single Pair Ethernet) based on an output at the slave device;
    an I2C controller; and
    a logical link control block;
    wherein data and control are selected from the I2C controller at the master device in an I2C mode of operation, and said data and control are selected from a path comprising the logical link control block at the master device in an SPE mode of operation.

12. The apparatus of claim 11 wherein the apparatus is in communication with a plurality of slave devices over a point-to-multipoint connection.

13. The apparatus of claim 11 wherein the arbitrator comprises a receiver with a pull-down resistor.

14. The apparatus of claim 11 wherein determining at the master device the slave device is configured for SPE comprises detecting an output voltage of zero based on a pull-down resistor and determining at the master device the slave device is configured for I2C comprises detecting an output voltage based on pull-up resistors.

15. The apparatus of claim 11 wherein said data and control selected from the logical link control block comprises said data and control selected from an SPE physical coding sublayer and wherein said SPE mode of operation utilizes the logical link control block to interface with higher level management and memory.

16. An apparatus comprising:
    an SPE (Single Pair Ethernet) management interface comprising:
        a transmitter and receiver for transmitting and receiving data to and from an end point device;
        an arbitrator for selecting a mode of operation based on detection of a protocol capability at the end point device;

a logical link controller for use in an SPE mode of operation upon detection of an SPE end point device; and a controller for use with another mode of operation, wherein data and control signals bypass the logical link controller in said another mode of operation.

17. The apparatus of claim 16 wherein said another mode of operation comprises an I2C (Inter-Integrated Circuit) mode of operation for communication with an I2C end point device.

18. The apparatus of claim 16 wherein said mode of operation is selected based on a receiver output.

19. The apparatus of claim 16 wherein the logical link controller maps between a register memory and Ethernet frame data.

20. The apparatus of claim 16 wherein the apparatus comprises a software driver for use with said SPE mode of operation and said another mode of operation.

\* \* \* \* \*